3,741,870
METHOD OF PREPARING $\Delta^{9(11)}$-ESTRONE

Gordon E. Mallett, Woking, England, assignor to Eli Lilly and Company, Indianapolis, Ind.
No Drawing. Filed Oct. 12, 1971, Ser. No. 188,547
Int. Cl. C07c 167/14, 167/18
U.S. Cl. 195—51 F    1 Claim

ABSTRACT OF THE DISCLOSURE $\Delta^{9(11)}$-estrone is prepared from 19-hydroxy cholesterol by fermentation using a Corynebacterium species.

BACKGROUND OF THE INVENTION

Sih et al., J. Am. Chem. Soc. 87, 2765 (1965) have described the conversion of 19-hydroxycholesterol to estrone using Nocardia species such as Nocardia restrictus in a submerged culture fermentation.

$\Delta^{9(11)}$-Estrone and related compounds have been prepared according to U.S. Pat. 3,258,471, by the treatment of 10$\beta$-carboxy-$\Delta^4$-estrene-3,17-dione with iodine, followed by a period of heating. A mixture of estrone and $\Delta^{9(11)}$-estrone is obtained. Hydrogenation of the $\Delta^{9(11)}$-estrone thus produced yields estrone itself.

SUMMARY OF THE INVENTION

This invention provides a method of preparing $\Delta^{9(11)}$-estrone from 19-hydroxycholesterol 3-acetate by fermentation with a Corynebacterium sp.-NRRL B–3931, obtainable from the ARS Culture Collection, Northern Regional Research Laboratories, Peoria, Ill., to be designated hereinafter as A24014. In practicing the invention, a culture of Corynebacterium A24014 is employed to inoculate a tank containing a suitable growth medium such as Trypticase soy broth and, after an initial growth period, usually about two days, the 19-hydroxycholesterol substrate in solution in acetone or other suitable solvent is added to the fermentation medium.

The organism employed in the practice of this invention, A24014, has the following cultural characteristics as determined by the procedures outlined in Bergy's Manual of Determinative Bacteriology, 7th edition (R. S. Breed, E. G. D. Murray, E. N. R. Smith, eds., William O. Wilkins, 1953, Baltimore, Md.). All studies were conducted at 30° C. unless otherwise noted. Morphology and motility were observed on Trypticase soy agar and broth from 18 to 72 hours incubation time. Carbon utilization, cultural characteristics and physiological studies were observed at 7 days.

TABLE I

| Property observed: | Characteristics of A24014 |
|---|---|
| Morphology | Cells 0.7–2.1$\mu$ by 0.7–1.4$\mu$; ranging from coccoid to irregularly shaped cells, occuring singly or in palisades. Club-shaped swellings or rudimentary branching is observed in liquid media. |
| Motility | Negative. |
| Acid-fastness | Negative. |
| Gram-stain | Positive. |
| Litmus milk | No change. |
| Gelatin liquefaction | Negative. |
| Oxygen requirements | Aerobic. |
| Indole production | Negative. |
| H$_2$S production | Negative. |
| Temperature requirements | Growth from 20° to 37°; no growth at 43°. |
| Colony characteristics on: | Characteristics of A24014 |
| Trypticase soy ajar | Circular, raised, reddish brown colonies with margin entire. |
| Czapek's agar | Circular, raised, white colonies with entire margin. |
| Sabourand's glucose | Very scant growth. |
| Tomato-paste oatmeal | No growth. |
| Nutrient agar | Growth sparse; circular slightly umbonate pale yellow colonies with margins entire. |
| Carbohydrate fermentation | Neither acid nor gas produced by culture on glucose, lactose, mannitol, sucrose or maltose. |

This invention is further illustrated by the following specific examples:

EXAMPLE I

A Trypticase soy agar slant was inoculated with Corynebacterium sp. A24014. The slant was incubated for about 3 days at 30° C. The culture of A24014 thus produced was used to inoculate Trypticase soy broth medium contained in shake flasks. These flasks were shaken on a rotary shaker for 3 days at 30° C. Five ml. of the vegetative growth thus produced was used to inoculate each of 20 flasks containing 100 ml. of Trypticase soy broth medium. These flasks were shaken on a rotary shaker for 2 days at 30° C. At this point 2 ml. of an acetone solution containing 50 mg. of 19-hydroxycholesterol 3-acetate was added to each flask and the incubation continued for another 3 days. The flask contents were combined and the combined broths were extracted twice with 1 l. of methylenechloride. The methylenechloride extracts were washed with water and dried. Evaporation of the solvent yielded a residue which was dissolved in 5 percent acetone in pentane and chromatographed over 50 g. of florisil. The chromatogram was developed with successive 1 l. portions of pentane containing increasing quantities of acetone. Fractions containing 10 percent acetone in pentane up to 20 percent acetone in pentane were pooled and the solvents removed by evaporation. The ultraviolet spectrum of the residue thus obtained was consistent with that to be expected from $\Delta^{9(11)}$-estrone, indicating that $\Delta^{9(11)}$-estrone was produced during the fermentation.

EXAMPLE II

A lyophilized pallet of Corynebacterium sp. A24014 was used to inoculate modified Trypticase soy broth medium. The inoculated culture was allowed to grow for two days at 30° C. on a rotary shaker. Fifty ml. of the vegetative growth thus produced was used to inoculate 1000 ml. of the same media and the fermentation allowed to proceed for 2 days at 30° C. on a rotary shaker. This second stage vegetative cultuer was used to inoculate 25 l. of modified Trypticase soy broth contained in a 44 l. fermentor with .25 l. of an anti-foam agent added. After 2 days incubation, 4.75 g. of 19-hydroxycholesterol 3-acetate in acetone was added and the fermentation continued for another 2 days. The steroidal material was extracted as before with methylenechloride and the solvent evaporated to yield a dry extract. The extract was dissolved in 1 l. of 0.1 N aqueous sodium hydroxideand 100 ml. of methanol. The alkaline solution was then extracted with 1.5 l. of pentane. The aqueous and organic layers were separated, the aqueous layer extracted with pentane and the pentane layer extracted with the same mixture of aqueous sodium hydroxide and methanol as before. The pentane layers were combined and 3.1 g. of 19-hydroxycholesterol acetate starting material obtained therefrom by evaporation of the solvents. The aqueous layers were combined and acidified to pH=3-4. $\Delta^{9(11)}$-Estrone, which was insoluble in the acidic medium, was extracted with methylenechloride. Evaporation of the methylene chloride yielded 1.42 g. of a residue comprising $\Delta^{9(11)}$-estrone which was purified by chromatography over florisil using chloroform as the eluant. Taking 50 ml. fractions, fractions 3-6 produced 60 mg. of crystalline $\Delta^{9(11)}$-estrone.

In the above fermentation, Trypticase soy broth modified contains the following ingerdients per liter.

| | G. |
|---|---|
| Trypticase soy medium | 30 |
| Peptone | 10 |
| Glucose | 3.75 |
| Water to 1 l. | |

In carrying out the above fermentations 19-hydroxycholesterol 3-acetate is employed as a substrate for the production of $\Delta^{9(11)}$-estrone. As will be apparent to those skilled in the art, however, other lower aliphatic esters of 19-hydroxycholesterol can also be employed, including the propionate, butyrate and the like.

I claim:
1. The process which comprises contacting 19-hydroxycholesterol 3-acetate with Corynebacterium sp. A24014 in a submerged culture fermentation under aerobic conditions to produce $\Delta^{9(11)}$-estrone and then isolating said $\Delta^{9(11)}$-estrone.

References Cited
UNITED STATES PATENTS

| 3,398,054 | 8/1968 | Vezina et al. | 195 51 G |
| 3,507,749 | 4/1970 | Sih | 195—51 G |

ALVIN E. TANENHOLTZ, Primary Examiner

U.S. Cl. X.R.

195—51 G